(12) United States Patent
Yang et al.

(10) Patent No.: US 12,535,419 B2
(45) Date of Patent: Jan. 27, 2026

(54) DEVICE AND METHOD FOR ESTIMATING CONCENTRATION DISTRIBUTION OF FLUORESCENT TRACER IN LOW PERMEABILITY MEDIUM

(71) Applicant: PUKYONG NATIONAL UNIVERSITY INDUSTRY-UNIVERSITY COOPERATION FOUNDATION, Busan (KR)

(72) Inventors: Min June Yang, Busan (KR); Chang Min Kim, Busan (KR); Jin Young Park, Busan (KR)

(73) Assignee: Pukyong National University Industry-University Cooperation Foundation, Busan (KR)

( * ) Notice: Subject to any disclaimer, the term of this patent is extended or adjusted under 35 U.S.C. 154(b) by 312 days.

(21) Appl. No.: 18/332,347

(22) Filed: Jun. 9, 2023

(65) Prior Publication Data
US 2024/0319095 A1   Sep. 26, 2024

(30) Foreign Application Priority Data
Mar. 21, 2023   (KR) .......................... 10-2023-0036826

(51) Int. Cl.
*G01N 21/64* (2006.01)
*G01N 21/85* (2006.01)

(52) U.S. Cl.
CPC ..... *G01N 21/6428* (2013.01); *G01N 21/6456* (2013.01); *G01N 21/85* (2013.01); *G01N 2021/6439* (2013.01)

(58) Field of Classification Search
None
See application file for complete search history.

(56) References Cited

U.S. PATENT DOCUMENTS

| | | | | |
|---|---|---|---|---|
| 5,948,684 A | * | 9/1999 | Weigl | B01F 33/30 436/52 |
| 6,376,843 B1 | * | 4/2002 | Palo | G01J 3/457 250/459.1 |

(Continued)

FOREIGN PATENT DOCUMENTS

| | | | | |
|---|---|---|---|---|
| EP | 1175602 B1 | * | 3/2003 | ......... G01N 21/6458 |
| JP | 11083744 A | * | 3/1999 | |

(Continued)

*Primary Examiner* — David J Makiya
*Assistant Examiner* — Djura Malevic
(74) *Attorney, Agent, or Firm* — Knobbe, Martens, Olson & Bear, LLP

(57) ABSTRACT

A device and method for estimating a concentration distribution of a fluorescent tracer in a low permeability medium is proposed. The device may obtain images by photographing acrylic boxes containing respective mixtures prepared by combining and stirring each type of clay with fluorescent tracer solutions. The device may also calculate a light intensity for the fluorescent tracer solutions for each clay, derive a light intensity of each RGB channel for each type of clay, select a channel representing a gradual change in the light intensity, and derive a concentration versus intensity equation of the selected channel. The device may further obtain images by photographing a flow chamber at an early stage and late stage of diffusion, estimate a fluorescent tracer concentration by using the concentration versus intensity equation, and evaluate validity of an estimation result by comparing the estimated fluorescent tracer concentration with a modeling value.

3 Claims, 15 Drawing Sheets

(56) References Cited

U.S. PATENT DOCUMENTS

| | | | | |
|---|---|---|---|---|
| 6,541,213 | B1* | 4/2003 | Weigl | G01N 15/10 |
| | | | | 436/514 |
| 6,941,825 | B2* | 9/2005 | Pawliszyn | G01N 30/00 |
| | | | | 436/178 |
| 8,963,949 | B2* | 2/2015 | Forutanpour | G06T 7/136 |
| | | | | 345/611 |
| 9,952,222 | B2* | 4/2018 | Yates | G01N 33/50 |
| 10,620,102 | B2* | 4/2020 | Mueller | G01N 11/00 |
| 11,298,699 | B2* | 4/2022 | Zhang | B01L 3/502761 |
| 11,959,923 | B2* | 4/2024 | Yates | G01N 33/52 |
| 2006/0173394 | A1* | 8/2006 | Stroock | A61L 27/20 |
| | | | | 602/41 |
| 2019/0331692 | A1* | 10/2019 | Yates | G01N 33/6845 |
| 2021/0169338 | A1* | 6/2021 | Shin | A61B 5/02007 |
| 2022/0082501 | A1* | 3/2022 | Gagner | C07D 495/04 |
| 2024/0280489 | A1* | 8/2024 | Yang | G01N 21/643 |
| 2024/0319095 | A1* | 9/2024 | Yang | G01N 21/6456 |
| 2025/0161976 | A1* | 5/2025 | Kerrigan | B05D 1/005 |

FOREIGN PATENT DOCUMENTS

| | | | | |
|---|---|---|---|---|
| JP | 6396911 | B2* | 9/2018 | G01N 15/1434 |
| KR | 10-2181744 | B1 | 11/2020 | |

* cited by examiner

DEVICE AND METHOD FOR ESTIMATING CONCENTRATION DISTRIBUTION OF FLUORESCENT TRACER IN LOW PERMEABILITY MEDIUM

CROSS REFERENCE TO RELATED APPLICATION

The present application claims priority to Korean Patent Application No. 10-2023-0036826, filed Mar. 21, 2023, the entire contents of which is incorporated herein for all purposes by this reference.

BACKGROUND

Technical Field

The present disclosure relates to a device and method for estimating a concentration distribution of a fluorescent tracer in a low permeability medium and, more particularly, to a device and method for estimating a concentration distribution of a fluorescent tracer in a low permeability medium, the device and method using a multi-channel image analysis technique in order to non-destructively and continuously measure the concentration of the fluorescent tracer in the low permeability medium during a flow chamber experiment for simulating an aquifer environment.

Description of the Related Technology

In general, in order to identify a flow mechanism of contaminants in various geologic media within a contaminated site and to further conduct a preliminary site survey for selecting a purification method, many researchers have performed experiments in which a flow chamber that simulates an actual underground environment is fabricated and a fluorescent tracer solution is made to flow into the chamber.

SUMMARY

One aspect is a device and method for estimating a concentration distribution of a fluorescent tracer in a low permeability medium, the device and method being capable of estimating concentrations of the tracer in the low permeability medium without disturbing a sample and estimating a wide range of concentrations of the tracer compared to concentrations of conventional single-channel measurement methods.

Another aspect is a device for estimating a concentration distribution of a fluorescent tracer in a low permeability medium, the device including: a pre-adsorption batch experiment unit configured to obtain images by photographing acrylic boxes containing respective mixtures prepared by combining and stirring each of a plurality of types of clay with fluorescent tracer solutions having a range of a plurality of set concentrations, and calculate a light intensity for each of the plurality of set concentrations of the fluorescent tracer solutions for each clay on the basis of the images obtained using an image processing program; a channel selection unit configured to derive a light intensity of each RGB channel for each type of clay on the basis of the light intensity for the plurality of set concentrations of the fluorescent tracer solutions for each clay, and select a channel representing a gradual change in the light intensity on the basis of the derived light intensity of each RGB channel for each type of clay; a concentration versus intensity formularization unit configured to derive a concentration versus intensity equation of the selected channel by using an analysis program; a flow chamber experiment and concentration estimation unit configured to obtain images by photographing a flow chamber at an early stage and late stage of diffusion while conducting a flow chamber experiment, and estimate a fluorescent tracer concentration by using the concentration versus intensity equation of the channel on the basis of the light intensity of each obtained image; and an estimation validity evaluation unit configured to evaluate validity of an estimation result by comparing the estimated fluorescent tracer concentration with a modeling value using a one-dimensional diffusion analysis solution.

In the device for estimating the concentration distribution of the fluorescent tracer in the low permeability medium according to the embodiment, the channel selection unit may be further configured to derive the light intensity of each RGB channel for each type of clay on the basis of the light intensity for each of the plurality of set concentrations of the fluorescent tracer solutions for each clay, quantify the derived light intensity of each RGB channel for each type of clay as a variation coefficient or a standard deviation, and select the channel representing the gradual change in the light intensity on the basis of the quantified light intensity of each RGB channel for each type of clay.

In the device for estimating the concentration distribution of the fluorescent tracer in the low permeability medium according to the embodiment, the flow chamber experiment and concentration estimation unit may be further configured to fill an aquifer with the fluorescent tracer while injecting the fluorescent tracer at a set concentration through an inlet of the aquifer and discharging the fluorescent tracer through an outlet of the aquifer in a state where there is provided the flow chamber having a plurality of glass beads disposed in a lower part thereof in order to simulate the aquifer and having a low permeability layer formed on an upper part of the glass beads and a light source is positioned between a camera and the flow chamber, cause the diffusion of the fluorescent tracer solutions from the aquifer having a high concentration to the low permeability layer having a low concentration due to a concentration gradient difference, obtain the images by photographing the flow chamber with the camera at the early stage and late stage of the diffusion, and estimate a fluorescent tracer concentration by using the concentration versus intensity equation of the channel on the basis of the light intensity of each obtained image.

Another aspect is a method for estimating a concentration distribution of a fluorescent tracer by using a device for estimating the concentration distribution of the fluorescent tracer in a low permeability medium, the method including: obtaining, by a pre-adsorption batch experiment unit, images by photographing respective acrylic boxes containing respective mixtures prepared by combining and stirring each of a plurality of types of clay with fluorescent tracer solutions having a range of a plurality of set concentrations, and calculate a light intensity for each of the plurality of set concentrations of the fluorescent tracer solutions for each clay on the basis of the images obtained using an image processing program; deriving, by a channel selection unit, a light intensity of each RGB channel for each type of clay on the basis of the light intensity for each of the plurality of set concentrations of the fluorescent tracer solutions for each clay or the light intensity for each of the plurality of set concentrations of the quantified fluorescent tracer solutions for each clay; selecting, by the channel selection unit, a channel representing a gradual change in the light intensity on the basis of the derived light intensity of each RGB channel for each type of clay; deriving, by a concentration versus intensity formularization unit using an analysis program, a concentration versus intensity equation of the selected channel; obtaining, by a flow chamber experiment and concentration estimation unit, images by photographing a flow chamber at an early stage and late stage of diffusion while conducting a flow chamber experiment, and estimate a fluorescent tracer concentration by using the concentration versus intensity equation of the channel on the basis of the light intensity of each obtained image; and evaluating, by an estimation validity evaluation unit, validity of an estimation result by comparing the estimated fluorescent tracer concentration with a modeling value using a one-dimensional diffusion analysis solution.

The method for estimating the concentration distribution of the fluorescent tracer according to another embodiment may further include quantifying, by the channel selection unit, the derived light intensity of each RGB channel for each type of clay as a variation coefficient or a standard deviation, after the deriving of the light intensity of each RGB channel for each type of clay.

According to the embodiment of the present disclosure, the device and method for estimating the concentration distribution of the fluorescent tracer in the low permeability medium is configured to obtain images by photographing acrylic boxes containing respective mixtures prepared by combining and stirring each of a plurality of types of clay with fluorescent tracer solutions having a range of a plurality of set concentrations, calculate a light intensity for each of the plurality of set concentrations of the fluorescent tracer solutions for each clay on the basis of the images obtained using an image processing program, derive a light intensity of each RGB channel for each type of clay on the basis of the light intensity for each of the plurality of set concentrations of the fluorescent tracer solutions for each clay, select a channel representing a gradual change in the light intensity on the basis of the derived light intensity of each RGB channel for each type of clay, derive, by using an analysis program, a concentration versus intensity equation of the selected channel, obtain images by photographing a flow chamber at an early stage and late stage of diffusion while conducting a flow chamber experiment, estimate a fluorescent tracer concentration by using the concentration versus intensity equation of the channel on the basis of the light intensity of each obtained image, and evaluate validity of an estimation result by comparing the estimated fluorescent tracer concentration with a modeling value using a one-dimensional diffusion analytical solution, whereby there exist effects of estimating the concentration of the tracer in the low permeability medium without disturbing a sample and estimating a wide range of concentrations of the tracer compared to those of conventional single-channel measurement methods.

DETAILED DESCRIPTION

Figure 1:
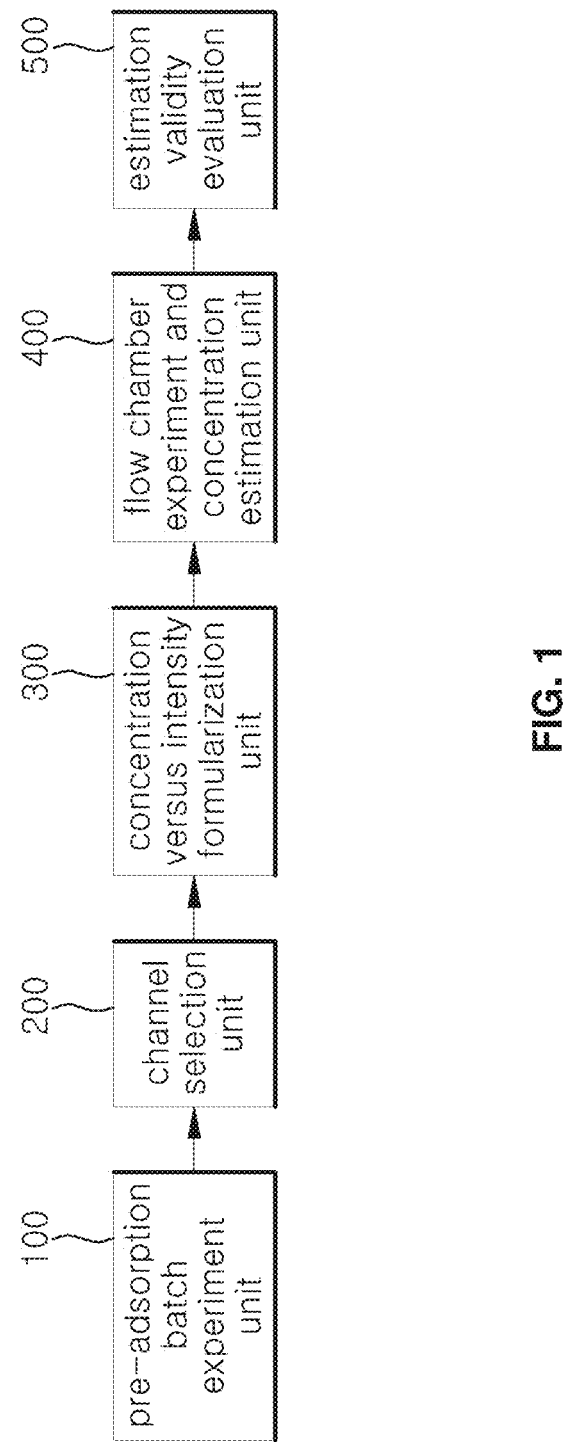
FIG. 1 is a block diagram of a device for estimating a concentration distribution of a fluorescent tracer in a low permeability medium according to an exemplary embodiment of the present disclosure.

During the simulated aquifer experiment, in order to measure a concentration of the tracer in the chamber, the experiment is carried out in a method of directly measuring a concentration of an influent at an inlet of the chamber and a concentration of an effluent after flowing through the chamber. Alternatively, during the experiment, in order to measure a concentration at a particular point inside the chamber, destroying of the flow chamber or stopping of the experiment was unavoidable.

However, for measuring a concentration distribution in a medium at a particular moment, concentrations are measured through destroying the flow chamber or the concentrations are directly measured through the inside of the flow chamber, so there is a problem that disturbance of a sample is inevitable and it is difficult to guarantee accuracy of the concentration measurement.

In addition, in describing the exemplary embodiment of the present disclosure, when it is determined that a detailed description of a known technology related to the present disclosure may unnecessarily obscure the subject matter of the present disclosure, the detailed description thereof will be omitted. In addition, terms to be described later are terms defined in consideration of functions in the present disclosure, which may vary according to the intention, custom, etc. of users or operators. Therefore, definitions of these terms should be made on the basis of the content throughout the present specification. Terms used in the detailed description are only for describing the exemplary embodiments of the present disclosure, and should not be construed as limiting in any way. Unless expressly used otherwise, expressions in the singular form include the meanings in the plural form. In this description, expressions such as "comprising", "including", or "provided with" are intended to indicate certain characteristics, numbers, steps, operations, elements, and any part or combination thereof, and it should not be construed to exclude the existence or possibility of one or more other characteristics, numbers, steps, operations, elements, and any part or the combination thereof other than those described.

In each system shown in the drawings, elements in some cases may each have the same reference number or different reference numbers to indicate that the elements represented may be different or similar to each other. However, the elements may have different implementations and operate with some or all of the systems shown or described in the present specification. Various elements shown in the drawings may be the same as or different from each other. Which one is called as a first element and which one is called as a second element is arbitrary.

In the present specification, a meaning that one component "transmits", "transfers", or "provides" data or signals to another component includes not only a meaning of transmitting, by one component, directly the data or signals to another component but also a meaning of transmitting the data or signals to another component via at least one other component.

Hereinafter, an exemplary embodiment of the present disclosure will be described in detail with reference to the drawings.

FIG. 1 is a block diagram of a device for estimating a concentration distribution of a fluorescent tracer in a low permeability medium according to the exemplary embodiment of the present disclosure.

According to the exemplary embodiment of the present disclosure, as shown in FIG. 1, the device for estimating the concentration distribution of the fluorescent tracer in the low permeability medium includes a pre-adsorption batch experiment unit (or a pre-adsorption batch experiment processor) 100, a channel selection unit (or a channel selection processor) 200, a concentration versus intensity formularization unit (or a concentration versus intensity formularization processor) 300, a flow chamber experiment and concentration estimation unit (or a flow chamber experiment and concentration estimation processor) 400, and an estimation validity evaluation unit (or an estimation validity evaluation processor) 500.

The pre-adsorption batch experiment unit 100 serves to obtain images through photographing, by a camera, acrylic boxes containing respective mixtures prepared by combining and stirring each of a plurality of types of clay (i.e., Kaolinite, Montmorillonite, and Bentonite) with fluorescent tracer solutions (i.e., sodium fluorescein) having a range of a plurality of set concentrations (0, 1, 10, 100, 500, 1000, and 2000 mg/L), and to calculate a light intensity for each of the plurality of set concentrations of the fluorescent tracer solutions for each clay by using an image processing program (e.g., an open source program called ImageJ) on the basis of the obtained image. After the photographing, the mixture is centrifuged to extract a supernatant, a concentration of the supernatant is measured by an ultraviolet spectrophotometer, and how each concentration of the previously set tracer solution decreases after the adsorption experiment is generated.

Figure 3:
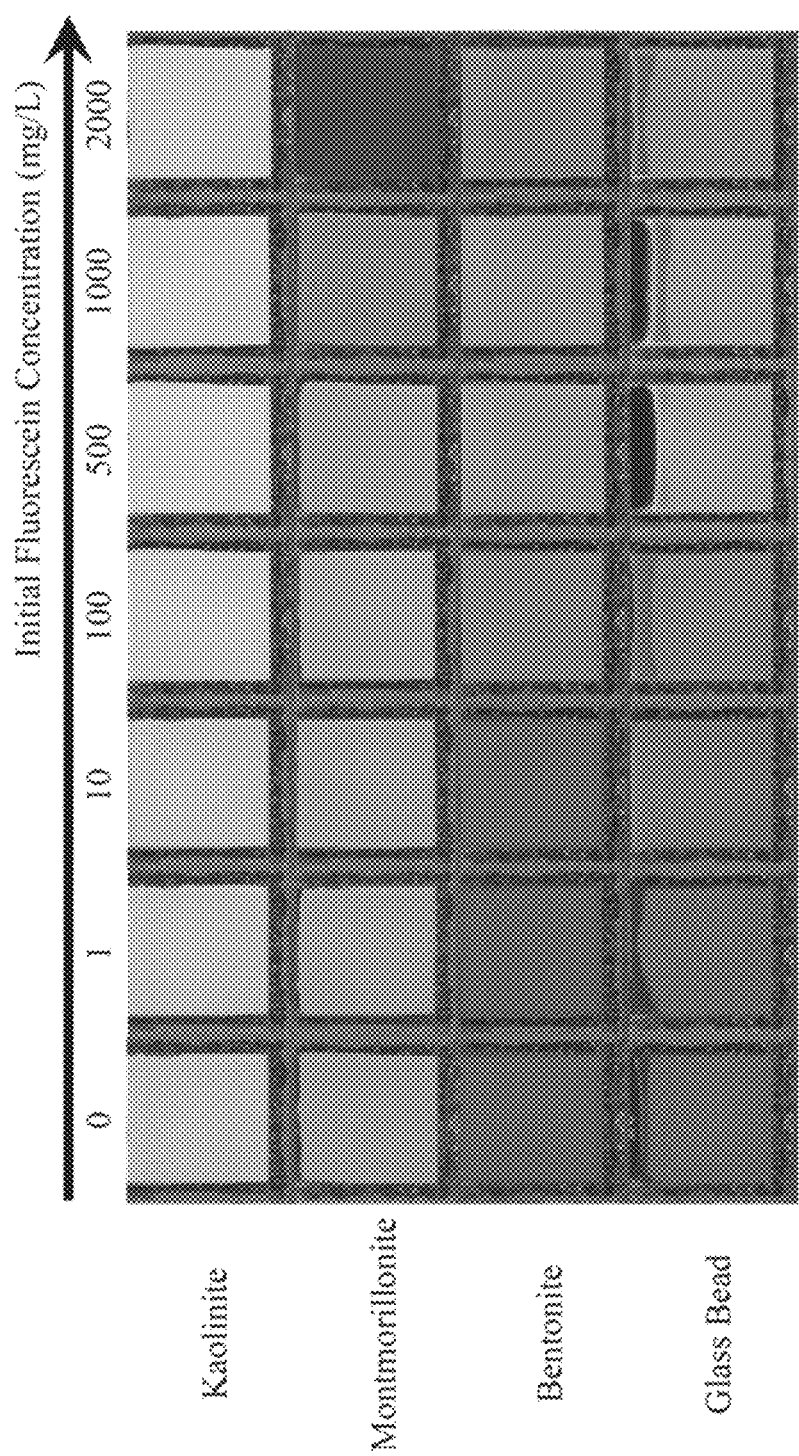
FIG. 3 is a view illustrating images for each type of clay, the images being obtained in a pre-adsorption batch experiment unit of FIG. 1.

FIG. 3 is a view illustrating images for each type of clay, the images being obtained in the pre-adsorption batch experiment unit of FIG. 1, and in the known concentration range (i.e., 0, 1, 10, 100, 500, 1000, and 2000 mg/L), a total of 21 samples may be derived according to each type of clay. Here, only three images of clay (i.e., Kaolinite, Montmorillonite, and Bentonite) were used. Glass beads were used experimentally, and were not used for formulization and strength estimation.

Figure 4:
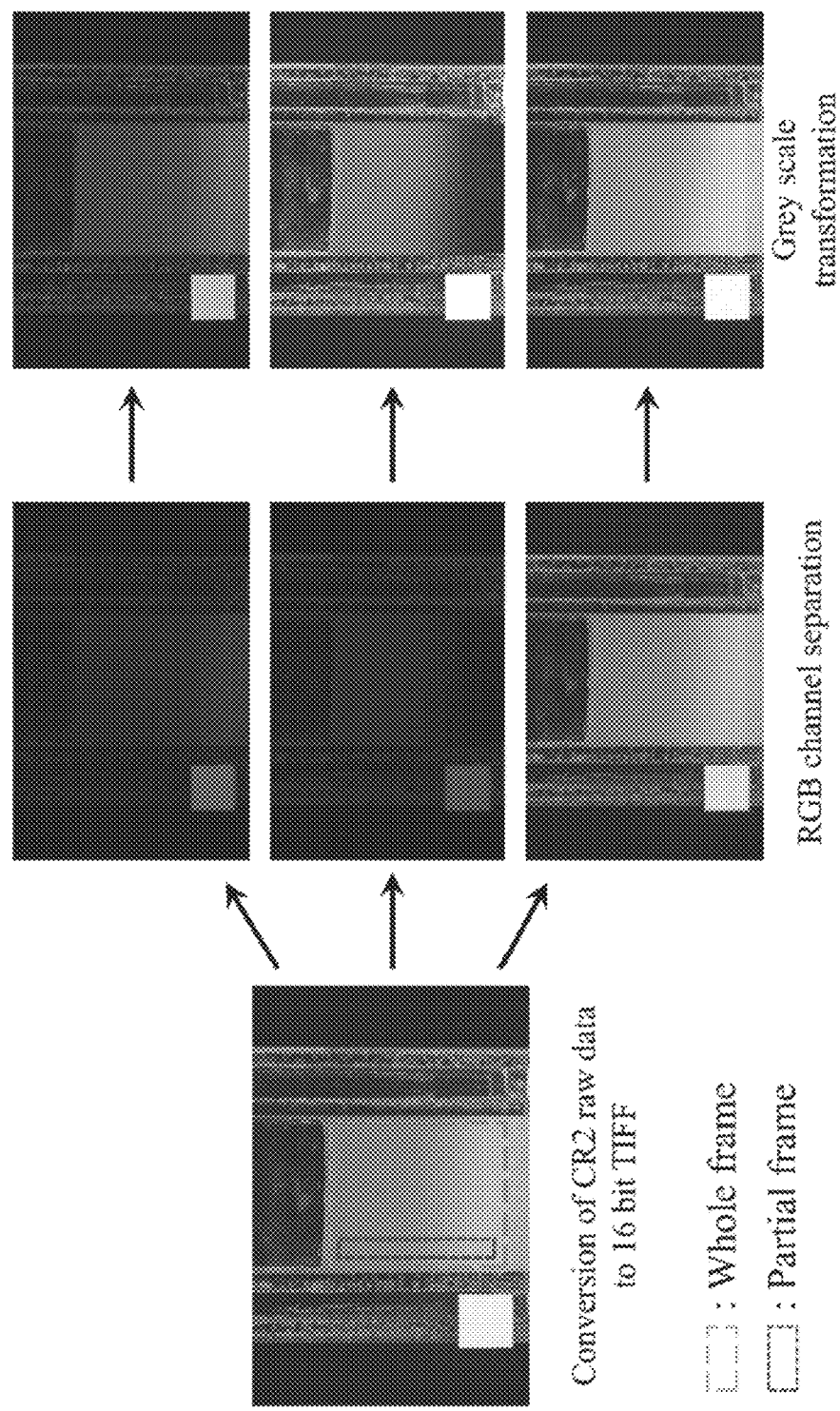
FIG. 4 is a view illustrating an image processing procedure by the pre-adsorption batch experiment unit of FIG. 1.

A procedure for calculating the light intensity for each of the plurality of set concentrations of the fluorescent tracer solutions for each clay by using the image processing program on the basis of the obtained image will be described with reference to FIG. 4.

The procedure for calculating the light intensity from the obtained image may be performed through the image processing program (i.e., ImageJ).

First, after an original file of the obtained image is uploaded to the image processing program, the obtained image is separated into three RGB color channels.

Next, the separated RGB color images are converted into images of a gray scale, and each color intensity according to the light and shade (i.e., the contrast) is automatically measured, and finally, a light intensity for each of the plurality of set concentrations of the fluorescent tracer solutions for each clay is obtained.

Light intensity means that a darkest part represents a low intensity and a channel intensity increases as a color approaches white, where a value range of the light intensity may be 0 to 255.

The channel selection unit 200 serves to derive a light intensity of each RGB channel for each type of clay on the basis of the light intensity for each of the plurality of set concentrations of the fluorescent tracer solutions for each clay, the light intensity being obtained by the pre-adsorption batch experiment unit 100, and to select a channel representing a gradual change in light intensity on the basis of the derived light intensity of each RGB channel for each type of clay.

Further, the channel selection unit 200 may derive a light intensity of each RGB channel for each type of clay on the basis of the light intensity for each of the plurality of set concentrations of the fluorescent tracer solutions for each clay, the light intensity being obtained by the pre-adsorption batch experiment unit 100, quantify the derived light intensity of each RGB channel for each type of clay as a variation coefficient or a standard deviation, and select a channel representing a gradual change in light intensity on the basis of the quantified light intensity of each RGB channel for each type of clay.

Figure 5A:
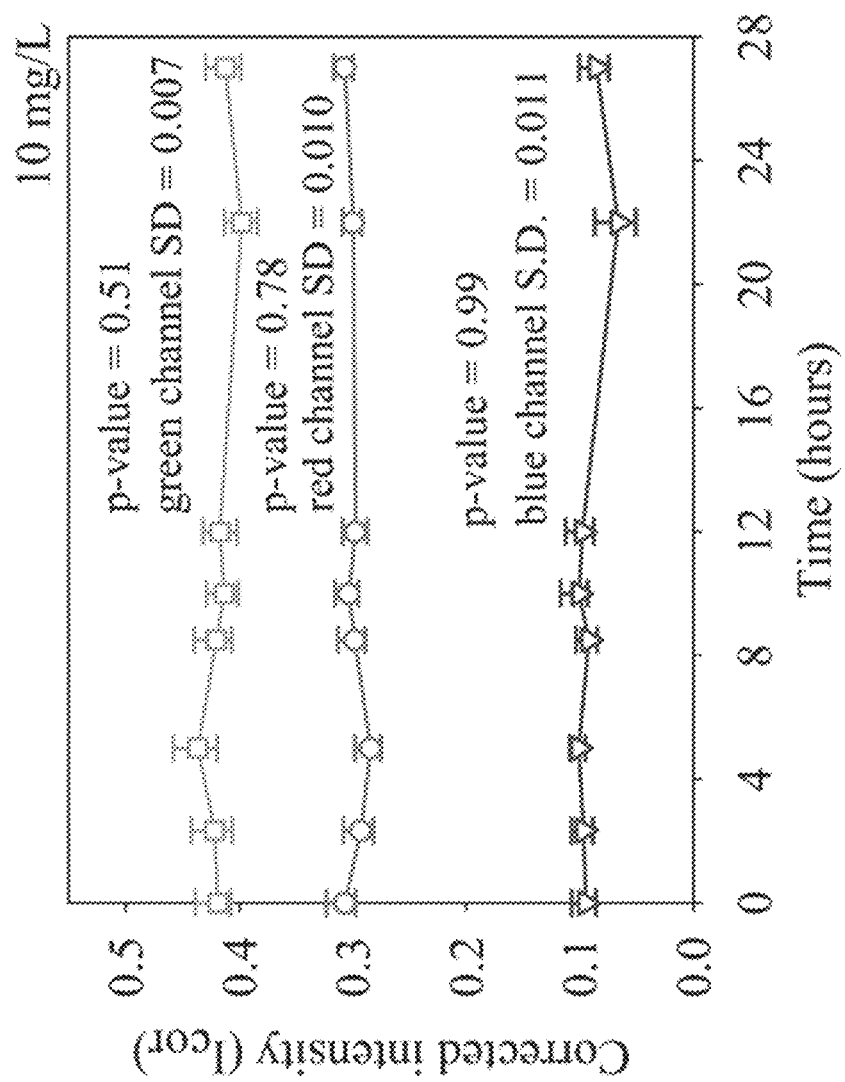
FIGS. 5A to 5D are graphs illustrating a light intensity of each RGB channel for each type of clay, the light intensity being derived by a channel selection unit of FIG. 1.
Figure 5B:
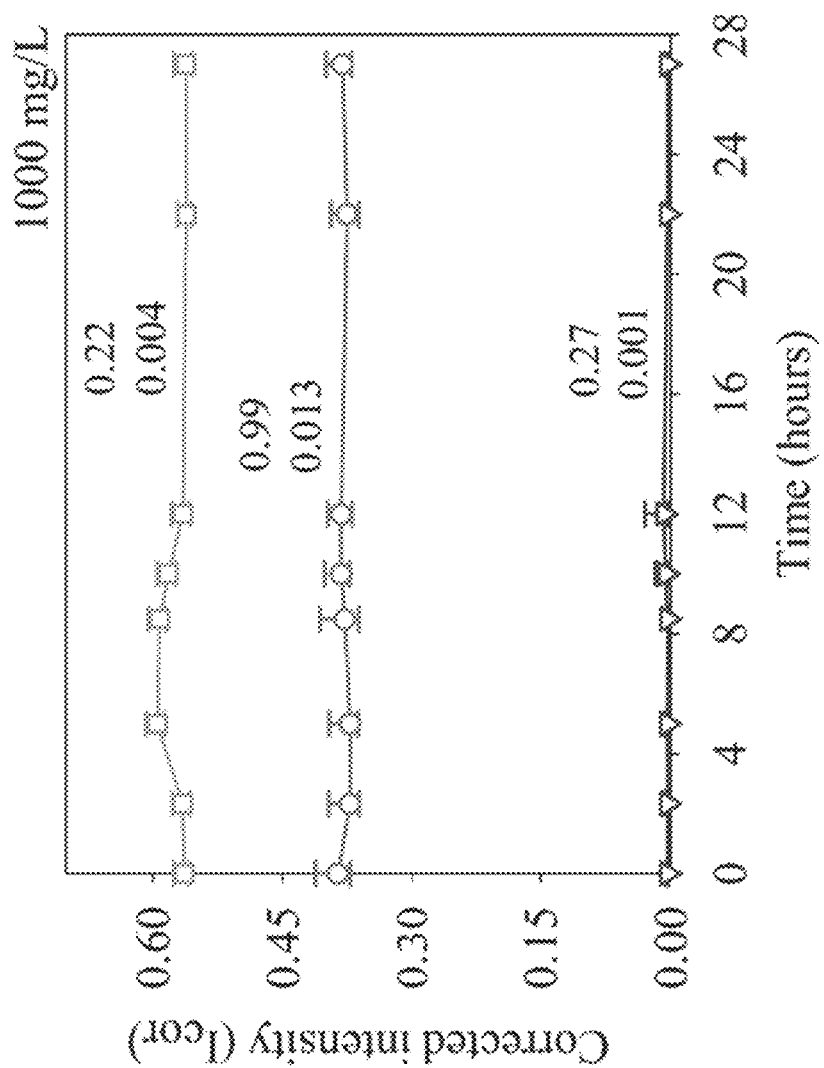
Figure 5C:
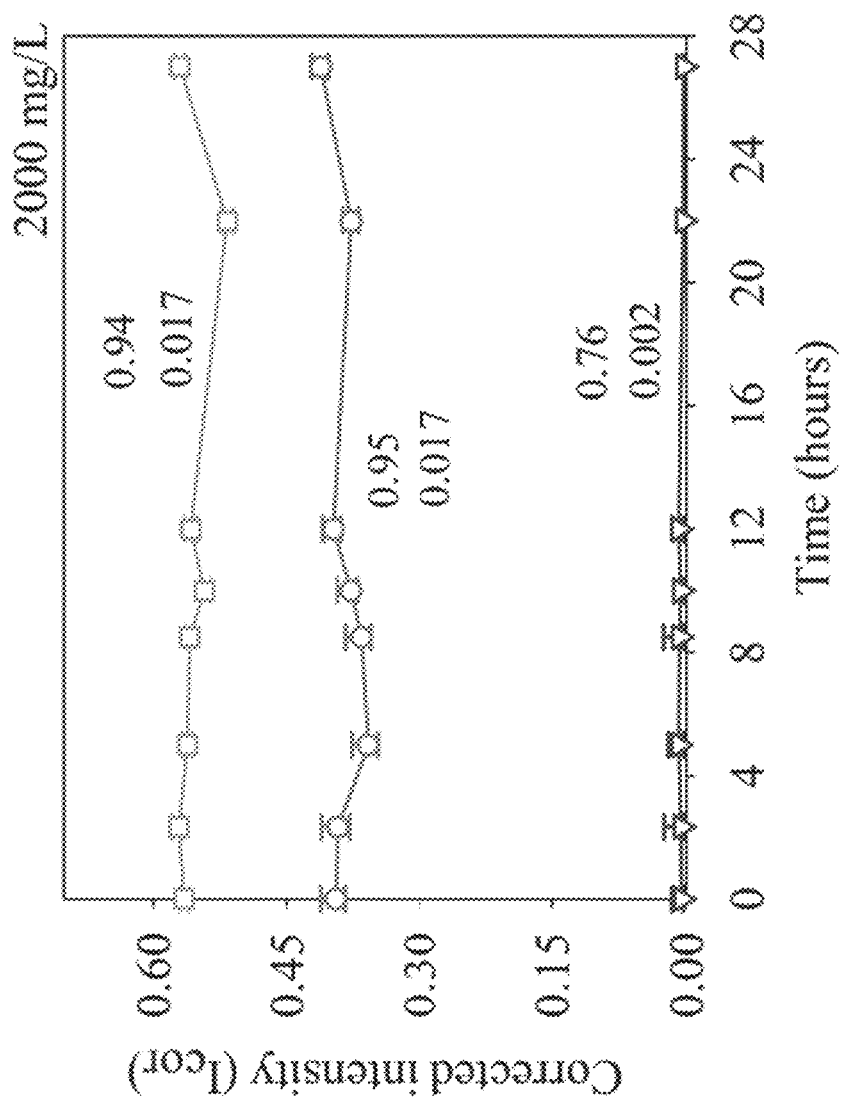
Figure 5D:
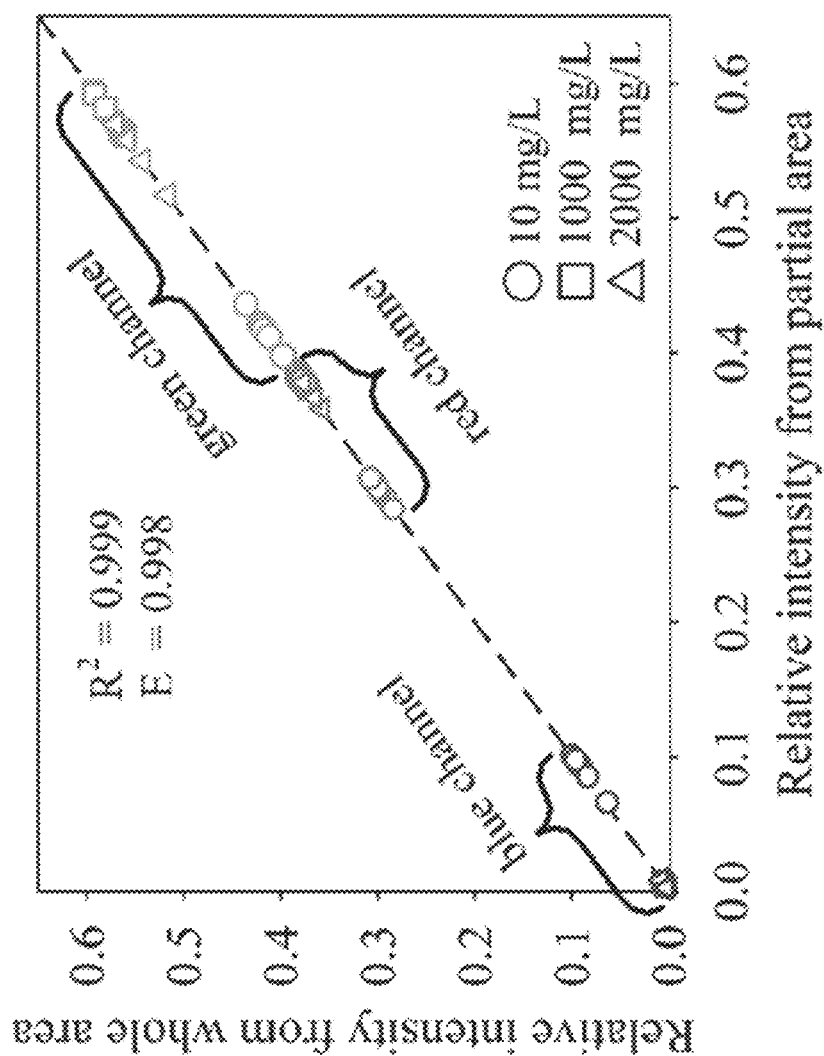
Figure 6A:
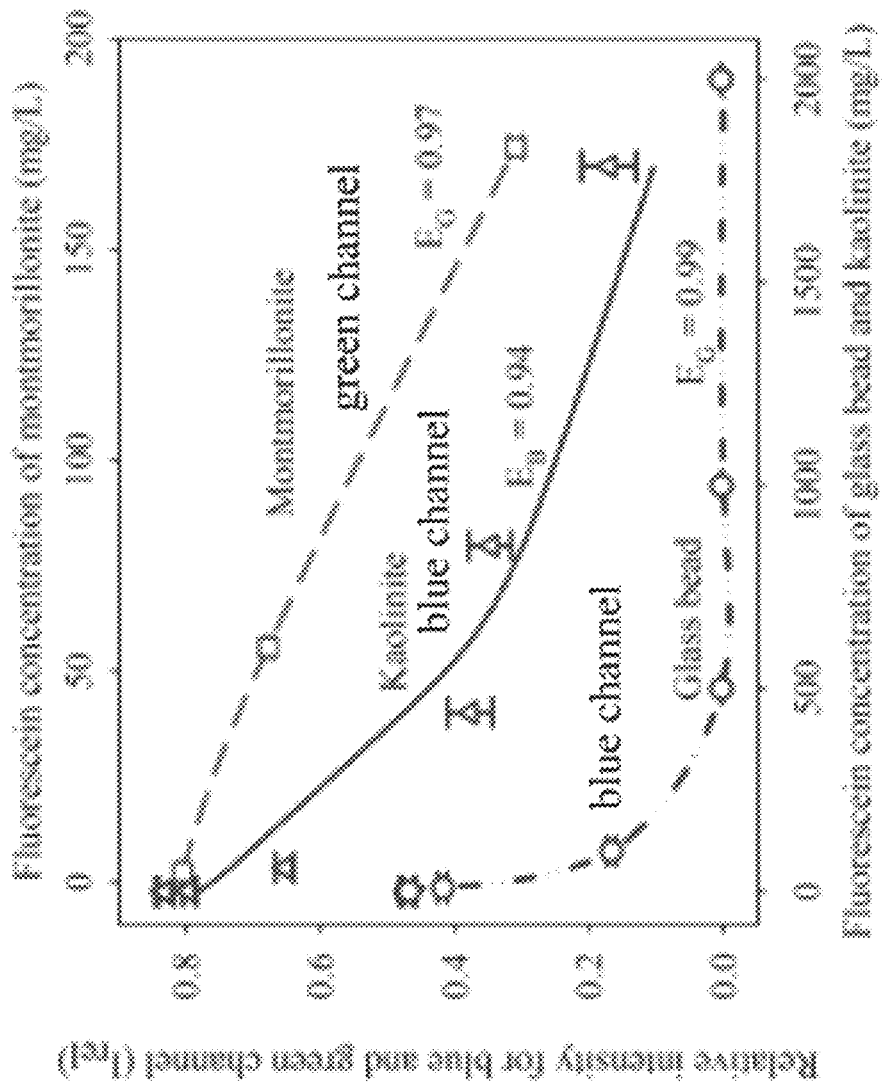
FIGS. 6A and 6B are graphs illustrating channels, which is selected by the channel selection unit of FIG. 1, and a corresponding expression line.
Figure 6B:
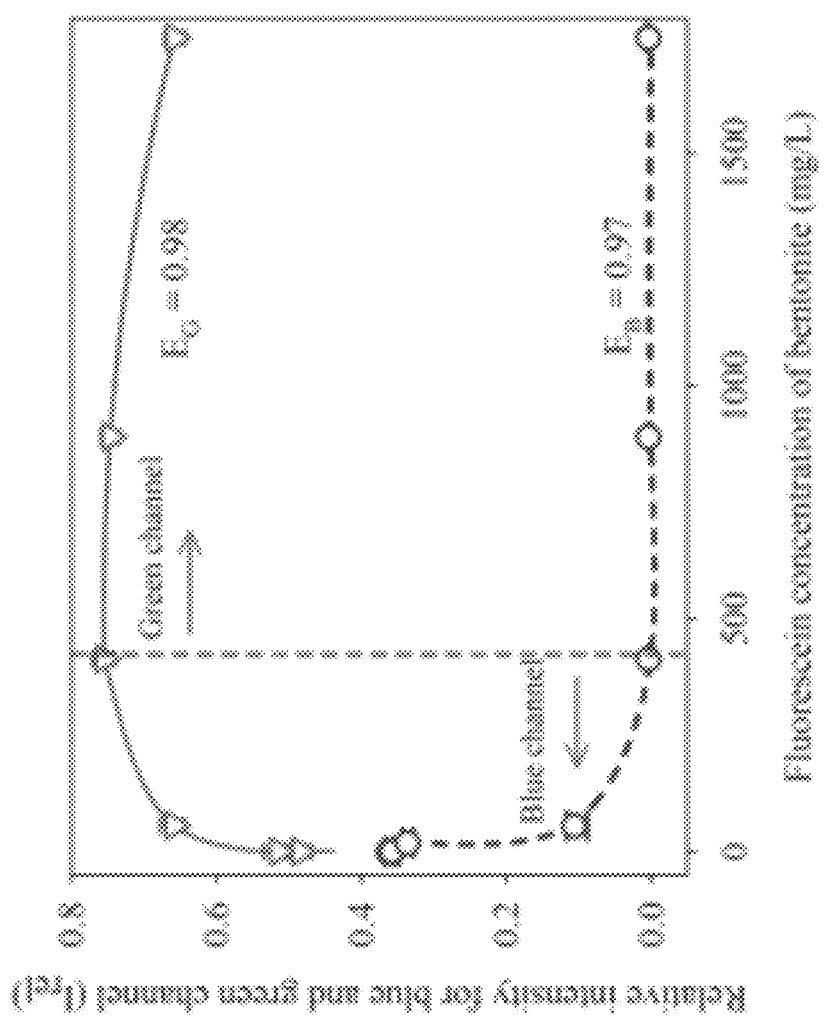

FIGS. 5A to 5D are graphs illustrating a light intensity of each RGB channel for each type of clay, the light intensity being derived by the channel selection unit of FIG. 1, and FIGS. 6A and 6B are graphs illustrating channels, which is selected by the channel selection unit of FIG. 1, and a corresponding expression line.

A shape of a graph most suitable for concentration estimation should increase or decrease gradually over the entire concentration range (i.e., the x-axis) without a rapid decrease or increase in intensity, and is unable to be used as a formula when one intensity value represents two concentration values (as in the red channel in FIG. 5B).

A channel that decreased most gradually and at the same time did not have an inflection point in the entire concentration range was selected in each clay medium. Kaolinite uses a blue channel and Montmorillonite uses a green channel. In the case of Montmorillonite's blue channel, a range of fluctuation is larger than that of the green channel, but the case characteristically shows that the intensity is rapidly decreased in a concentration range of 5 mg/L or less, and then is gradually increased. When such a channel of concentration-intensity patterns is applied to concentration estimation, a relational expression that does not have an inflection point should be selected because otherwise two concentrations are calculated from one light intensity. In a case of Bentonite, before about 414 mg/L, the blue channel shows the most gradual change, but in a range greater than or equal to 414 mg/L, the green channel shows a shape of a gradual decrease as the concentration thereof increases. Accordingly, only for bentonite, based on 414 mg/L, the entire concentration range of about 1800 mg/L may be estimated only when the blue channel is to be used in the low concentration range and at the same time the green channel in the high concentration range.

As shown in FIGS. 6A and 6B, a channel showing the most gradual concentration change over the entire tracer solution concentration range was selected for each type of clay.

Table 1 shows variation coefficients and standard deviations of respective RGB channel intensities for each type of clay, and it may be confirmed that the variability or deviation of a selected channel is generally large.

TABLE 1

| Clay type | Channel | $C_v$ | SD |
|---|---|---|---|
| Kaolinite | $R_{Low}$ | 0.067 | 0.058 |
| | G | 0.056 | 0.055 |
| | B* | 0.474 | 0.271 |
| Montmorillonite | $R_{Low}$ | 0.156 | 0.082 |
| | G* | 0.260 | 0.202 |
| | B | 1.114 | 0.074 |
| Bentonite | R | 0.258 | 0.125 |
| | $R_{Low}$ | 0.267 | 0.103 |
| | $R_{High}$ | 0.033 | 0.019 |
| | G | 0.145 | 0.097 |
| | $G_{Low}$ | 0.213 | 0.123 |
| | $G_{High}$ | 0.075 | 0.054 |
| | B | 1.595 | 0.144 |
| | $B_{Low}$ | 0.718 | 0.167 |
| | $B_{High}$ | 0.065 | 0.000 |

The concentration versus intensity formularization unit 300 may derive, by using an analysis program (e.g., Excel solver), a concentration versus intensity equation of the channel selected by the channel selection unit 200. The equation was generated based on when a degree of agreement between actual data (a plot) and values (a line) estimated through the generated equation was the highest.

The flow chamber experiment and concentration estimation unit 400 serves to obtain images by photographing the flow chamber at an early stage and a late stage of diffusion while conducting the flow chamber experiment and estimate a fluorescent tracer concentration by using the concentration versus intensity equation of the channel, the equation being derived by the concentration versus intensity formularization unit 300 on the basis of the light intensity of each obtained image.

Figure 7:
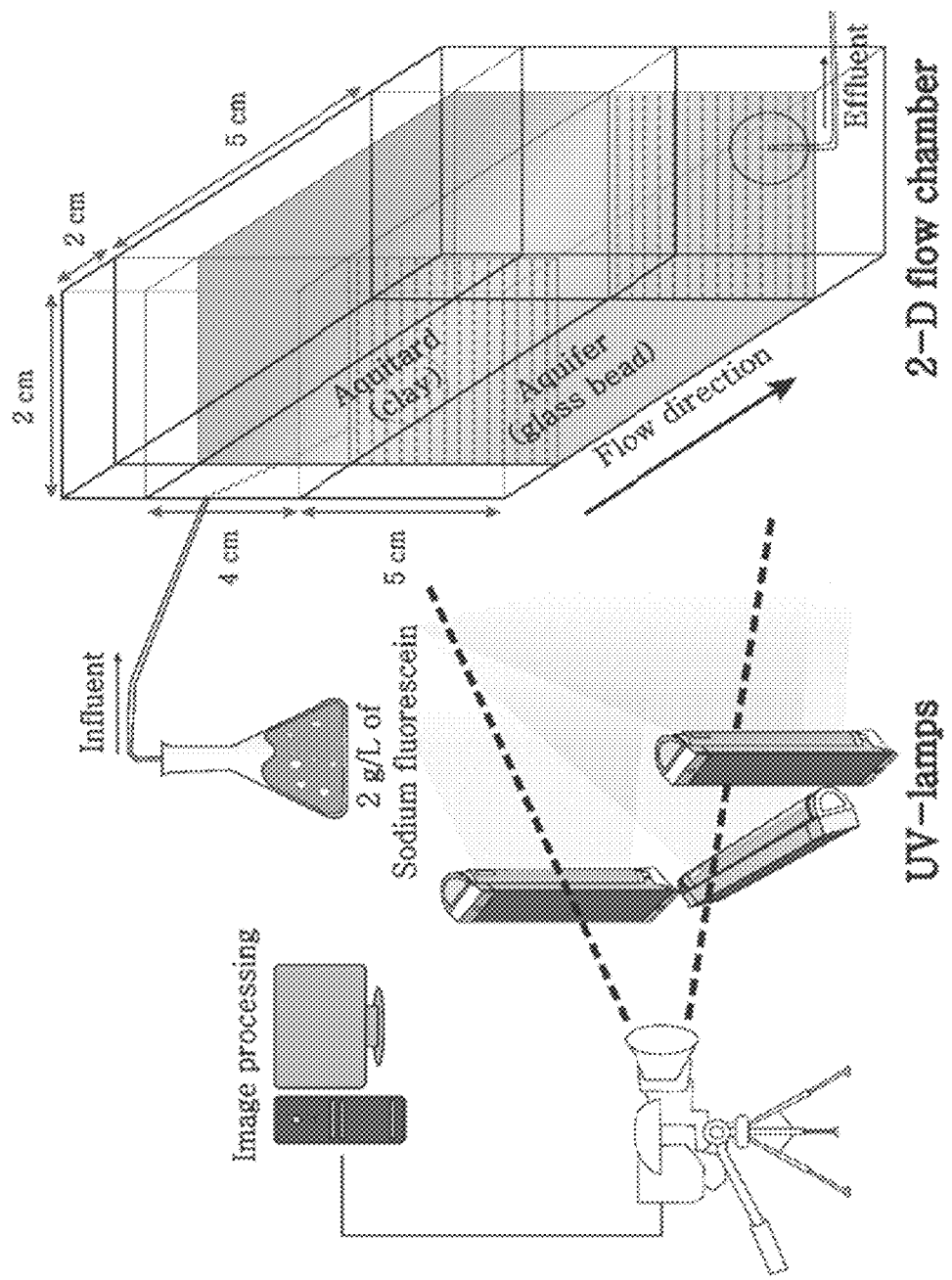
FIG. 7 is a view illustrating a flow chamber experiment system according to the exemplary embodiment of the present disclosure.

As shown in FIG. 7, for the flow chamber experiment, the flow chamber experiment and concentration estimation unit 400 is configured such that a light source (e.g., a UV lamp) is positioned between a camera and the flow chamber, a plurality of glass beads is disposed on a lower part of the flow chamber to simulate an aquifer, and the flow chamber having a low permeability layer formed therein is provided on an upper part of the glass beads.

While injecting a fluorescent tracer at a set concentration through an inlet of the aquifer and discharging the fluorescent tracer through an outlet of the aquifer, the flow chamber experiment and concentration estimation unit 400 fills the aquifer with the fluorescent tracer and causes diffusion of the fluorescent tracer solution having a high concentration from the aquifer to a low permeability layer having a low concentration due to a concentration gradient difference. The flow chamber experiment and concentration estimation unit 400 obtains images by photographing the flow chamber with the camera at an early stage and a late stage of the diffusion, and estimates fluorescent tracer concentrations by using the concentration versus intensity equation of the channel, the equation being derived by the concentration versus intensity formularization unit 300 on the basis of the light intensity of each obtained image.

The estimation validity evaluation unit 500 serves to evaluate validity of an estimation result by comparing the fluorescent tracer concentration estimated by the flow chamber experiment and concentration estimation unit 400 with a modeling value using a one-dimensional diffusion analytical solution.

FIGS. 8A to 8D are views illustrating a process of evaluate the validity by comparing the estimation result of the fluorescent tracer concentration with the one-dimensional diffusion analytical solution by the estimation validity evaluation unit of FIG. 1.

The one-dimensional diffusion analytical solution is an equation that represents a concentration distribution of a solute when dissolved-phase ions in a low permeability layer move from a high concentration area to a low concentration area by diffusion occurring due to a concentration difference. A change in concentration over time may be expressed as a double derivative of the concentration change and an effective diffusion coefficient according to a distance traveled through the diffusion.

In FIGS. 8A to 8D, one-dimensional diffusion modeling values (i.e., solid lines) and fluorescent tracer concentration values (i.e., dotted lines) estimated using the equation of the channel selected by the channel selection unit 200 are shown in FIGS. 8A to 8D according to the low permeability medium (i.e., clay). An E value represents a degree of agreement between a concentration value and a modeling value, and the closer to 1, the higher the degree of agreement between the two values.

Figure 8A:
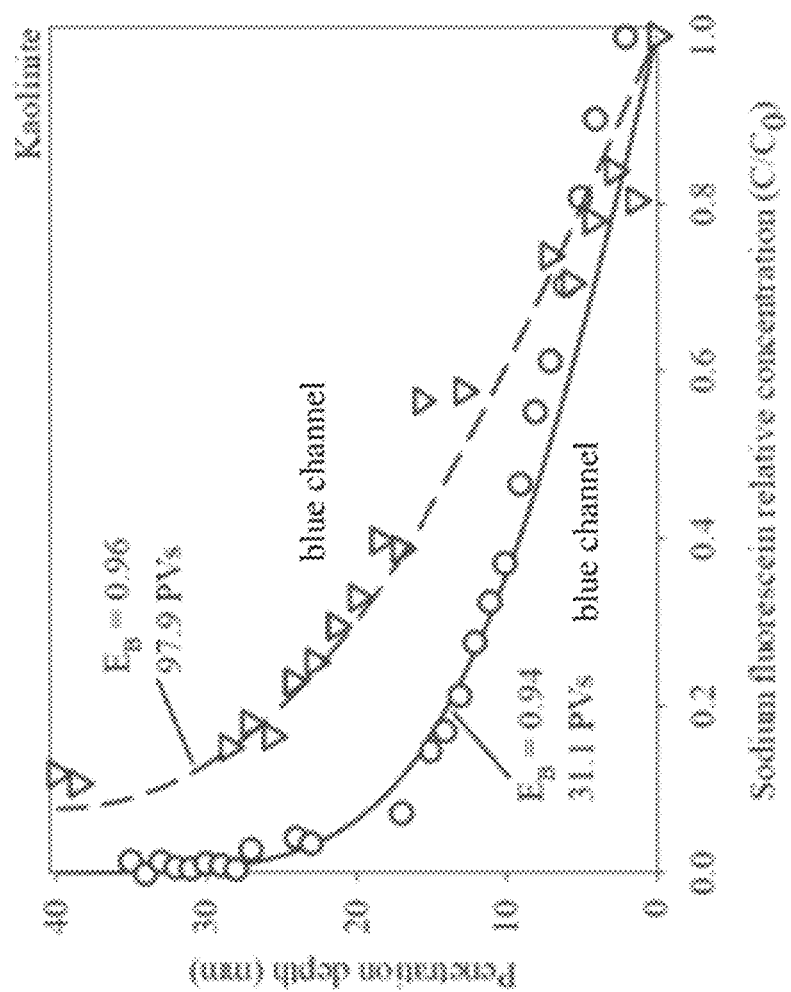
FIGS. 8A to 8D are views illustrating a process of evaluate validity by comparing an estimation result of a fluorescent tracer concentration with a one-dimensional diffusion analytical solution by an estimation validity evaluation unit of FIG. 1.
Figure 8B:
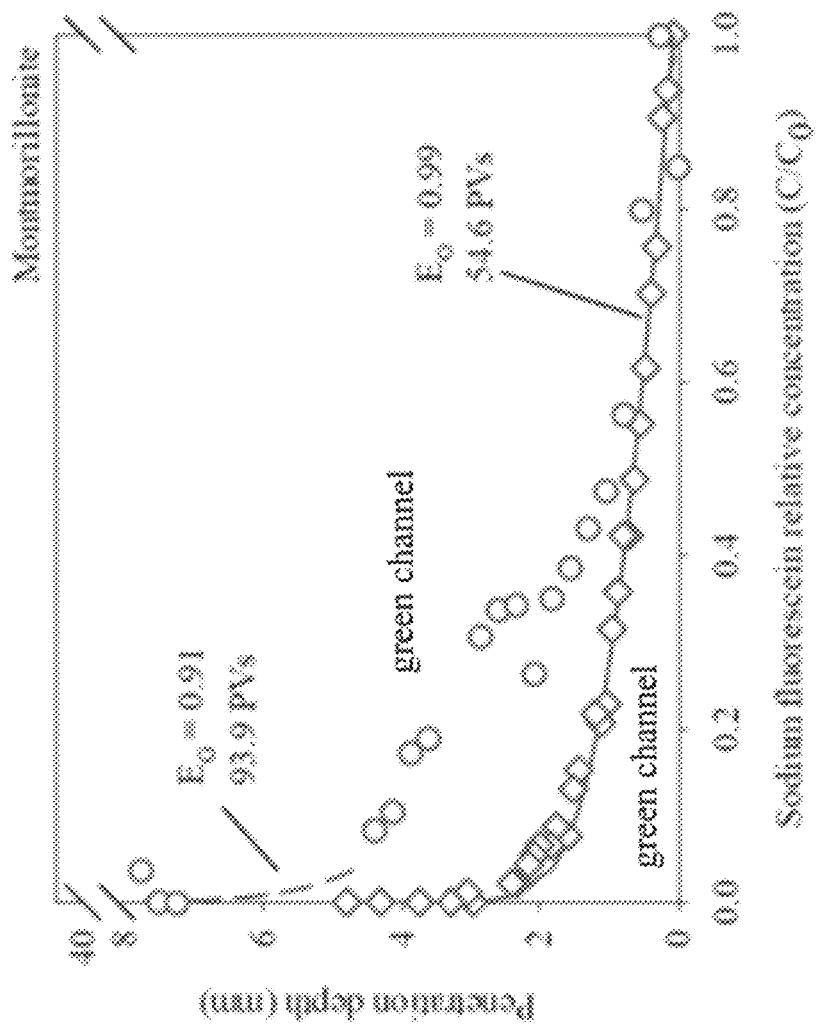
Figure 8C:
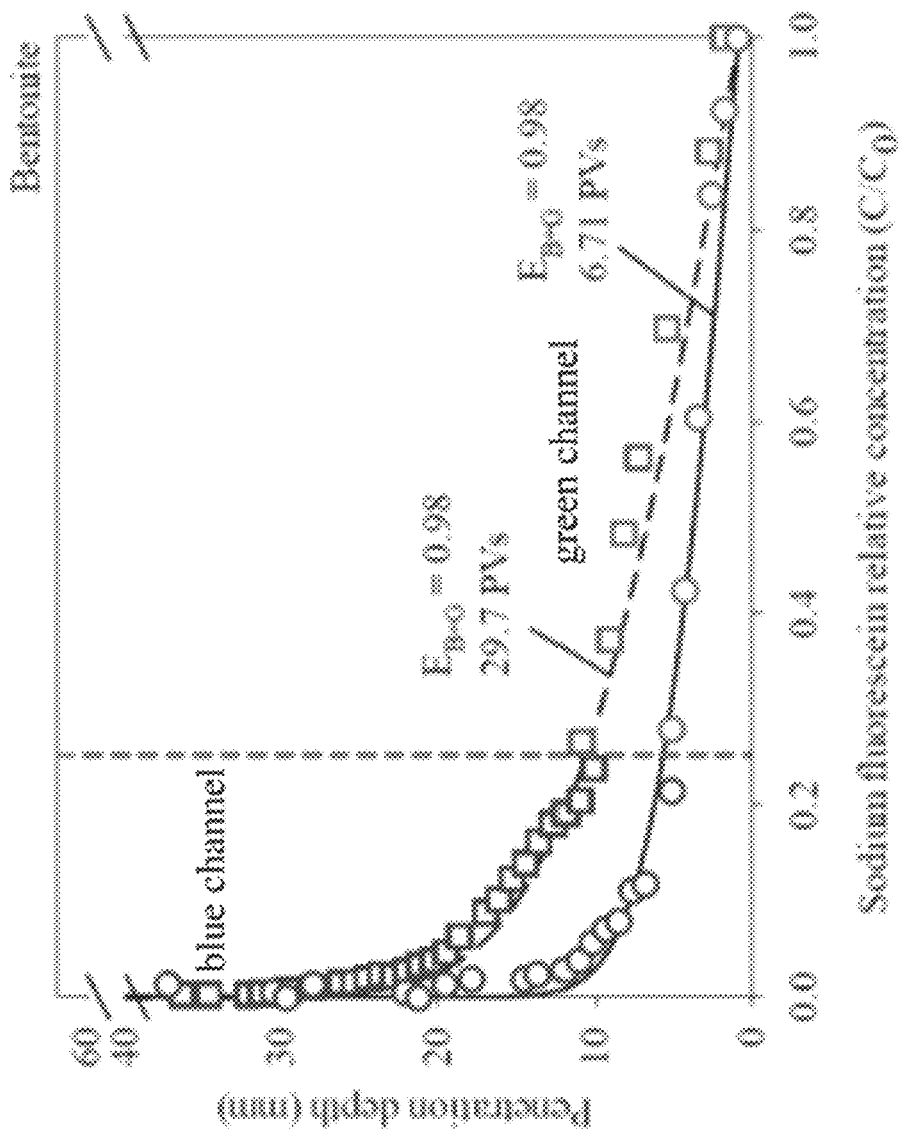
Figure 8D:
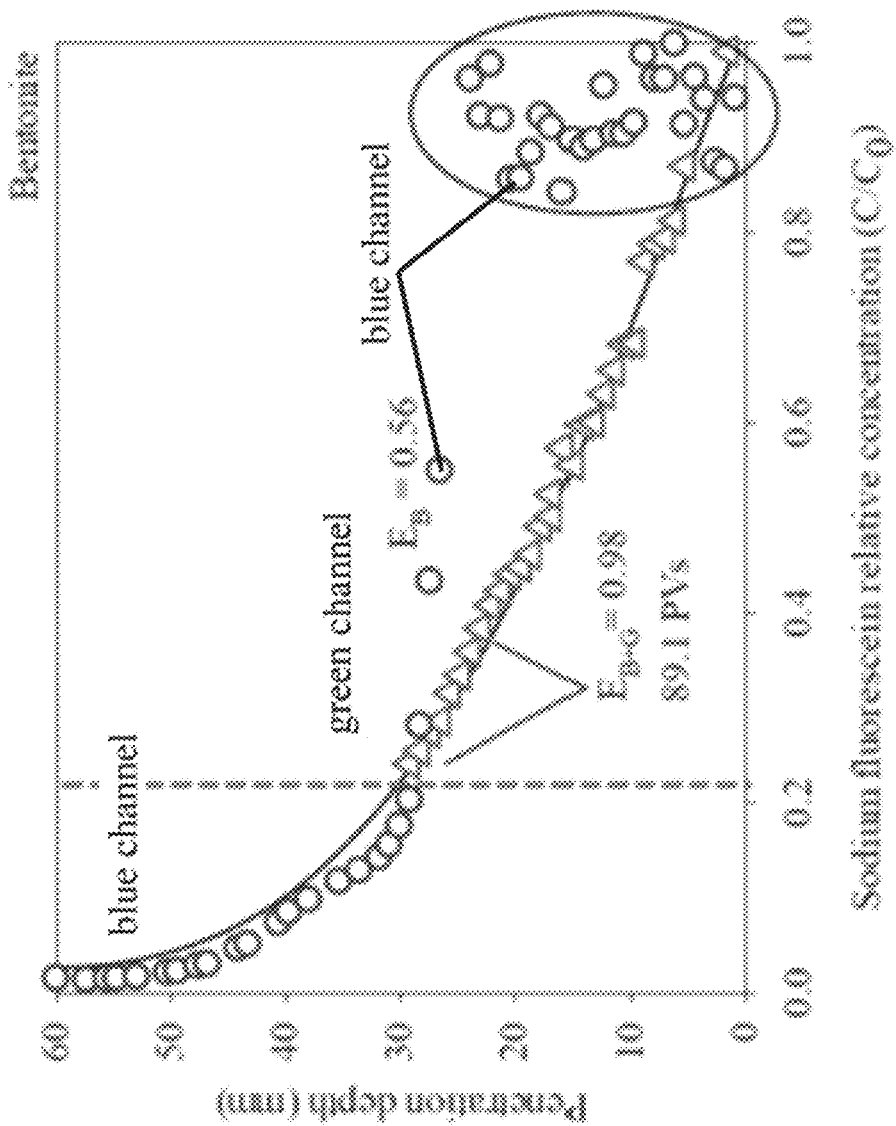

Experimental measurements were made in each of the early and late stages of the diffusion, and were expressed as Pore Volumes (PVs). FIGS. 8A and 8B respectively show the results of Kaolinite clay and Montmorillonite clay, and the degree of agreement is very high at 0.91 or more in both of the early and late stages of the diffusion. In the case of Bentonite, the degree of agreement is also high at 0.98 in FIG. 8C, which is for the early stage of the diffusion. However, in the case of the late stage of the diffusion of Bentonite, when only a single blue channel was applied, the degree of agreement was decreased down to 0.56. Presumably, this is because there was no intensity range of the blue channel according to the concentration change of the tracer solution in the range of about 414 mg/L or more, and accordingly, the concentration was not estimated [the part marked with a round circle in FIG. 8D]. Therefore, in the channel selection unit 200 as described above, in the case of the bentonite channel, a concentration distribution estimation technique provided with a method of simultaneously applying two channels should be applied.

Hereinafter, a method for estimating a concentration distribution of a fluorescent tracer by using the device for estimating the concentration distribution of the fluorescent tracer in the low permeability medium according to the exemplary embodiment of the present disclosure configured as described above will be described.

Figure 2:
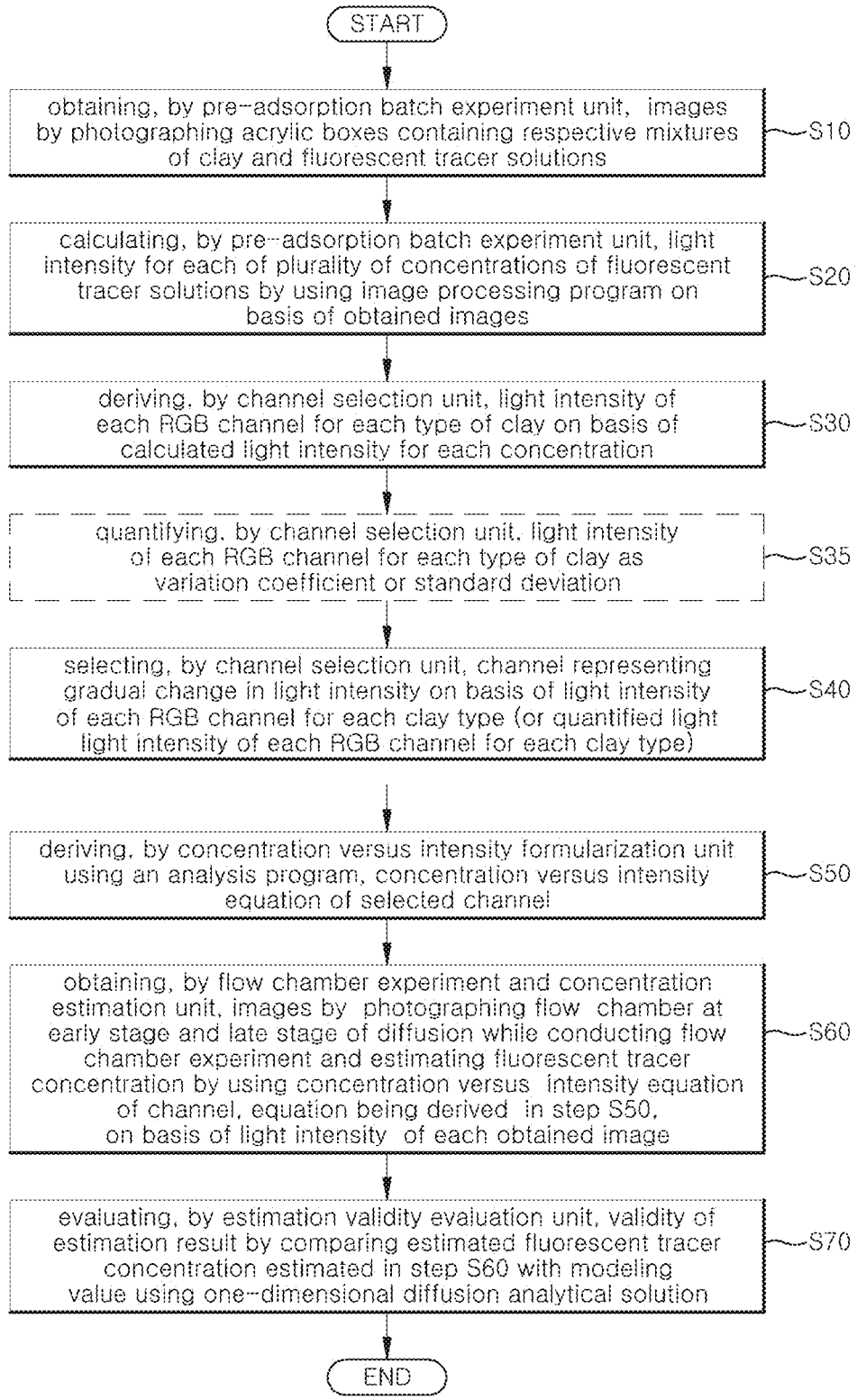
FIG. 2 is a flowchart illustrating a method for estimating a concentration distribution of a fluorescent tracer by using the device for estimating the concentration distribution of the fluorescent tracer in the low permeability medium of FIG. 1.

FIG. 2 is a flowchart illustrating the method for estimating the concentration distribution of the fluorescent tracer by using the device for estimating the concentration distribution of the fluorescent tracer in the low permeability medium of FIG. 1, where S denotes step.

First, in step S10, a pre-adsorption batch experiment unit 100 obtains images by photographing, by a camera, acrylic boxes containing respective mixtures prepared by combining and stirring each of a plurality of types of clay with fluorescent tracer solutions having a range of a plurality of set concentrations, and in step S20, the pre-adsorption batch experiment unit 100 calculates a light intensity for each of the plurality of set concentrations of the fluorescent tracer solutions for each clay on the basis of the images obtained using an image processing program.

Next, in step S30, the channel selection unit 200 derives a light intensity of each RGB channel for each type of clay on the basis of the light intensity for each of the plurality of set concentrations of the fluorescent tracer solutions for each clay, the light intensity being calculated in step S20.

Next, in step S35, the channel selection unit 200 quantifies, as a variation coefficient or standard deviation, the light intensity of each RGB channels for each type of clay, the light intensity being derived in step S30. This step may optionally be omitted.

Next, in step S40, the channel selection unit 200 selects a channel representing a gradual change in light intensity on the basis of the light intensity, which is derived in step S30, of each RGB channel for each type of clay (or the light intensity for each of the plurality of set concentrations of the fluorescent tracer solutions for each clay, the light intensity being quantified in step S35).

Next, in step S50, the concentration versus intensity formularization unit 300 derives, by using an analysis program, a concentration versus intensity equation of the channel, which is selected in step S40.

Next, in step S60, the flow chamber experiment and concentration estimation unit 400 obtains images by photographing the flow chamber at an early stage and a late stage of diffusion while conducting the flow chamber experiment and estimates a fluorescent tracer concentration by using concentration versus intensity equation of the channel, the equation being derived in step S50, on the basis of the light intensity of each obtained image.

Next, in step S70, the estimation validity evaluation unit 500 evaluates validity of an estimation result by comparing the estimated fluorescent tracer concentration estimated in step S60 with a modeling value using a one-dimensional diffusion analytical solution.

According to the embodiment of the present disclosure, the device and method for estimating the concentration distribution of the fluorescent tracer in the low permeability medium is configured to obtain images by photographing acrylic boxes containing respective mixtures prepared by combining and stirring each of a plurality of types of clay with fluorescent tracer solutions having a range of a plurality of set concentrations, calculate a light intensity for each of the plurality of set concentrations of the fluorescent tracer solutions for each clay on the basis of the images obtained using an image processing program, derive a light intensity of each RGB channel for each type of clay on the basis of the light intensity for each of the plurality of set concentrations of the fluorescent tracer solutions for each clay, select a channel representing a gradual change in the light intensity on the basis of the derived light intensity of each RGB channel for each type of clay, derive, by using an analysis program, a concentration versus intensity equation of the selected channel, obtain images by photographing a flow chamber at an early stage and late stage of diffusion while conducting a flow chamber experiment, estimate a fluorescent tracer concentration by using the concentration versus intensity equation of the channel on the basis of the light intensity of each obtained image, and evaluate validity of an estimation result by comparing the estimated fluorescent tracer concentration with a modeling value using a one-dimensional diffusion analytical solution, thereby estimating the concentration of the tracer in the low permeability medium without disturbing a sample and estimating a wide range of concentrations of the tracer compared to those of conventional single-channel measurement methods.

The best exemplary embodiments are disclosed in the drawings and specifications, and although specific terms are used, these are only used for the purpose of describing the embodiments of the present disclosure, and are not used to limit the meaning or limit the scope of the present disclosure described in the claims. Accordingly, those skilled in the art may be able to appreciate that various modifications and other equivalent embodiments are possible. Therefore, the true technical protection scope of the present disclosure will be defined by the technical spirit of the appended patent claims.

What is claimed is:

1. A device for estimating a concentration distribution of a fluorescent tracer in a low permeability medium, the device comprising:
   a pre-adsorption batch experiment processor configured to:
      obtain images by photographing acrylic boxes containing respective mixtures prepared by combining and stirring each of a plurality of types of clay with fluorescent tracer solutions having a range of set concentrations, the photographed images comprising a plurality of RGB image sets, each corresponding to a clay type and including red, green, and blue channels, and
      calculate a concentration light intensity for each set concentration of the fluorescent tracer solutions for each clay type using the corresponding RGB image set and an image processing program;
   a channel selection processor configured to:
      derive a channel light intensity of each red, green, and blue channel of each RGB image set corresponding to a clay type across the set concentrations, so that multiple derived channel light intensities are obtained for each channel of each clay type, and
      select a channel, from red, green, and blue channels of each of the plurality of RGB image sets, that exhibits a gradual change in concentration light intensity based on the derived channel light intensities of each RGB image set for each clay type;
   a concentration versus intensity formularization processor configured to derive a concentration versus intensity equation of the selected channel by using an analysis program;
   a flow chamber experiment and concentration estimation processor configured to:
      obtain images by photographing a flow chamber at an early stage and late stage of diffusion while conducting a flow chamber experiment, and
      estimate a fluorescent tracer concentration by using the concentration versus intensity equation of the channel on the basis of the channel light intensity of each obtained image; and
   an estimation validity evaluation processor configured to evaluate validity of an estimation result by comparing the estimated fluorescent tracer concentration with a modeling value using a one-dimensional diffusion analysis solution,
   wherein the channel selection processor is further configured to:
      quantify the derived channel light intensity of each red, green, and blue channel within each RGB image set corresponding to a clay type as a variation coefficient or a standard deviation, producing a plurality of quantified channel light intensities corresponding to the clay types, and select the channel representing the gradual change among the plurality of quantified channel light intensities.

2. The device of claim 1, wherein the flow chamber experiment and concentration estimation processor is further configured to:

fill an aquifer with the fluorescent tracer while injecting the fluorescent tracer at a set concentration through an inlet of the aquifer and discharging the fluorescent tracer through an outlet of the aquifer in a state where there is provided the flow chamber having a plurality of glass beads disposed in a lower part thereof in order to simulate the aquifer and having a low permeability layer formed on an upper part of the glass beads and a light source is positioned between a camera and the flow chamber, cause the diffusion of the fluorescent tracer solutions from the aquifer having a high concentration to the low permeability layer having a low concentration due to a concentration gradient difference, obtain the images by photographing the flow chamber with the camera at the early stage and late stage of the diffusion, and estimate a fluorescent tracer concentration by using the concentration versus intensity equation of the channel on the basis of the channel light intensity of each obtained image.

3. A method for estimating a concentration distribution of a fluorescent tracer by using a device for estimating the concentration distribution of the fluorescent tracer in a low permeability medium, the method comprising:

obtaining, by a pre-adsorption batch experiment processor, images by photographing respective acrylic boxes containing respective mixtures prepared by combining and stirring each of a plurality of types of clay with fluorescent tracer solutions having a range of set concentrations, the photographed images comprising a plurality of RGB image sets, each corresponding to a clay type and including red, green, and blue channels;

calculating, by the pre-adsorption batch experiment processor, a concentration light intensity for each set concentration of the fluorescent tracer solutions for each clay type using the corresponding RGB image set and an image processing program;

deriving, by a channel selection processor, a channel light intensity of each red, green, and blue channel of each RGB image set corresponding to a clay type across the set concentrations, so that multiple derived channel light intensities are obtained for each channel of each clay type;

selecting, by the channel selection processor, a channel, from red, green, and blue channels of each of the plurality of RGB image sets, that exhibits a gradual change in concentration light intensity based on the derived channel light intensities of each RGB image set for each clay type;

deriving, by a concentration versus intensity formularization processor using an analysis program, a concentration versus intensity equation of the selected channel;

obtaining, by a flow chamber experiment and concentration estimation processor, images by photographing a flow chamber at an early stage and late stage of diffusion while conducting a flow chamber experiment, and estimate a fluorescent tracer concentration by using the concentration versus intensity equation of the channel on the basis of the channel light intensity of each obtained image; and evaluating, by an estimation validity evaluation processor, validity of an estimation result by comparing the estimated fluorescent tracer concentration with a modeling value using a one-dimensional diffusion analysis solution, the method further comprising:

quantifying, by the channel selection processor, the derived channel light intensity of each red, green, and blue channel within each RGB image set corresponding to a clay type as a variation coefficient or a standard deviation, producing a plurality of quantified channel light intensities corresponding to the clay types, and selecting, by the channel selection processor, the channel representing the gradual change among the plurality of quantified channel light intensities.

* * * * *